US012434857B2

(12) United States Patent
Valentine

(10) Patent No.: US 12,434,857 B2
(45) Date of Patent: Oct. 7, 2025

(54) TACTICAL AIR CONTROL SHELTER

(71) Applicant: Genesis Aerospace Solutions, LLC, Ponte Vedra, FL (US)

(72) Inventor: Mitchell Potter Valentine, Ponte Vedra, FL (US)

(73) Assignee: Genesis Aerospace Solutions, LLC, Ponte Vedra, FL (US)

( * ) Notice: Subject to any disclaimer, the term of this patent is extended or adjusted under 35 U.S.C. 154(b) by 236 days.

(21) Appl. No.: 18/455,021

(22) Filed: Aug. 24, 2023

(65) Prior Publication Data

US 2024/0166371 A1 May 23, 2024

Related U.S. Application Data

(63) Continuation-in-part of application No. 29/870,013, filed on Jan. 13, 2023.

(Continued)

(51) Int. Cl.

*E04B 1/343* (2006.01)
*B64F 1/36* (2017.01)

(Continued)

(52) U.S. Cl.

CPC .............. *B64F 1/36* (2013.01); *E04B 1/3442* (2013.01); *E04H 12/182* (2013.01); *H02S 10/20* (2014.12); *H02S 20/22* (2014.12)

(58) Field of Classification Search

CPC ................ E04H 1/1205; E04H 1/1227; E04H 2001/1283; E04H 12/18; E04H 12/182;

(Continued)

(56) References Cited

U.S. PATENT DOCUMENTS

| | | | | |
|---|---|---|---|---|
| 1,896,433 A * | 2/1933 | Windeknecht | ...... | E04B 1/34305 52/67 |
| 3,106,750 A * | 10/1963 | Jarman | ................. | E04B 1/3431 52/67 |

(Continued)

FOREIGN PATENT DOCUMENTS

| | | | | |
|---|---|---|---|---|
| EP | 172770 A * | 2/1986 | ......... | E04B 1/34305 |
| EP | 372147 A * | 6/1990 | ........... | E04B 1/3442 |

(Continued)

*Primary Examiner* — Kyle J. Walraed-Sullivan

(57) ABSTRACT

A tactical air control shelter includes a modular shelter, a power source, a Very-Small-Aperture Satellite (VSAT), a telescopic tower system, and a communication and server rack. The modular shelter is configured with a main shelter, a first expandable section, and a second expandable section as the first expandable section and the second expandable section are slidably mounted to the main shelter and positioned opposite of each other. The power source is integrated into the main shelter, the first expandable section, and the second expandable section. The VSAT is externally mounted to the main shelter. The telescopic tower system is internally mounted to the main shelter extends and retract through a roof of the main shelter. The communication and server rack is internally mounted to the main shelter. The VSAT, the telescopic tower system, and the communication and server rack are electrically connected to the power source.

14 Claims, 8 Drawing Sheets

Related U.S. Application Data

(60) Provisional application No. 63/384,480, filed on Nov. 21, 2022.

(51) Int. Cl.

| | |
|---|---|
| ***E04B 1/344*** | (2006.01) |
| ***E04H 1/12*** | (2006.01) |
| ***E04H 12/18*** | (2006.01) |
| ***H02S 10/20*** | (2014.01) |
| ***H02S 20/22*** | (2014.01) |

(58) Field of Classification Search

CPC ............... E04B 1/34305; E04B 1/3431; E04B 1/34317; E04B 1/34321; E04B 1/34384; E04B 1/3442; E04B 1/3444

See application file for complete search history.

(56) References Cited

U.S. PATENT DOCUMENTS

| | | | | |
|---|---|---|---|---|
| 3,845,591 | A * | 11/1974 | Stine | E04B 1/34305 160/202 |
| 6,223,479 | B1 * | 5/2001 | Stockli | E04B 1/3444 52/68 |
| 8,534,001 | B2 | 9/2013 | Scott, IV | |
| 8,593,102 | B2 | 11/2013 | McGuire et al. | |
| 10,364,583 | B2 | 7/2019 | Tanner | |
| 10,648,169 | B2 * | 5/2020 | Lucho Do Valle | E04B 1/34384 |
| 2002/0179598 | A1 * | 12/2002 | Kuhn | E04B 1/34305 220/1.5 |
| 2005/0072062 | A1 * | 4/2005 | Aust | E04B 1/3431 52/79.1 |
| 2007/0144078 | A1 * | 6/2007 | Frondelius | E04B 1/34305 52/67 |
| 2010/0024314 | A1 * | 2/2010 | Pope | E04B 1/3431 52/67 |
| 2011/0007157 | A1 | 1/2011 | Sekelsky et al. | |
| 2011/0146751 | A1 * | 6/2011 | McGuire | F03D 9/007 136/245 |
| 2012/0000141 | A1 * | 1/2012 | Forsland | E04B 1/19 52/66 |
| 2012/0037622 | A1 * | 2/2012 | Cantin | E04H 3/08 220/23.83 |
| 2013/0263527 | A1 | 10/2013 | Barrett et al. | |
| 2014/0001786 | A1 * | 1/2014 | Cantin | B60P 3/34 296/26.14 |
| 2014/0125134 | A1 * | 5/2014 | Van Straten | E04H 12/182 320/101 |
| 2014/0311051 | A1 * | 10/2014 | Fagan | E04B 1/34384 52/79.5 |
| 2014/0360105 | A1 * | 12/2014 | Trout | E04B 1/3431 52/79.5 |
| 2015/0292194 | A1 * | 10/2015 | Calafatis | E04B 1/34321 52/67 |
| 2015/0308110 | A1 * | 10/2015 | Cantin | E04B 1/3431 296/26.14 |
| 2017/0130475 | A1 * | 5/2017 | Park | F24F 13/26 |
| 2018/0155950 | A1 * | 6/2018 | Van Wyk | H02S 20/30 |
| 2019/0356035 | A1 * | 11/2019 | Dominguez | E04H 12/182 |
| 2021/0263537 | A1 | 8/2021 | Belt et al. | |
| 2022/0025664 | A1 * | 1/2022 | Bullard | E04H 1/1205 |
| 2024/0175253 | A1 * | 5/2024 | Zhou | E04B 1/3444 |
| 2024/0183148 | A1 * | 6/2024 | Zhou | E04B 1/3444 |
| 2025/0084633 | A1 * | 3/2025 | Pan | E04B 1/34384 |
| 2025/0109587 | A1 * | 4/2025 | Pan | E04B 1/34305 |

FOREIGN PATENT DOCUMENTS

| | | | | |
|---|---|---|---|---|
| EP | 1251207 | A2 * | 10/2002 | E04B 1/34305 |
| EP | 1279775 | A2 * | 1/2003 | E04B 1/34305 |
| GB | 2214945 | A * | 9/1989 | A01G 9/16 |
| WO | WO-2005078203 | A1 * | 8/2005 | E04B 1/34305 |

* cited by examiner

TACTICAL AIR CONTROL SHELTER

FIELD OF THE INVENTION

The present invention generally relates to a remote operated tactical air control and communication shelter. More specifically, the present invention relates to an expandable, collapsible, and deployable shelter that may be fielded to different locations in both short-term and long-term capacity.

BACKGROUND OF THE INVENTION

Command, Control, Communications, and Computer applications, also known as C-4, must be enhanced in order to overcome emerging airspace evolution challenges. Rapid growth in the Advanced Air Mobility (AAM) industry has spurred the need for agile drone integration and detection, electric vertical take-off, and landing (EVTOL) operations, and an aviation disaster response capability while simultaneously establishing a high-fidelity security and surveillance system. Generally, during natural disasters or in war zones, air control towers and/or other communication systems may be destroyed, or the qualified personnel needed to accomplish the aircraft support needs may not be able to get to the unsafe areas. Subsequently, end users need an innovative solution to confront the new aviation integration challenges fueled by technology advancements, reliance on Very Small Aperture Satellite Systems (VSAT), flight automation, remote system connectivity, and data fusion integration to enhance and streamline performance and staffing challenges. A self-sustaining deployable tower, VSAT container that is compact enough to rapidly field into areas of different terrains that also includes a remote air traffic control tower system that is fully equipped with all the necessary features for communications, protection, data links, and transfers, as well as surveillance capabilities, etc., does not exist in the consumer market.

An objective of the present invention is to provide users with a compact, agile shelter system that can more than double in size when deployed and can be fielded in disaster areas, rural and remote locations, war zones, and regions of the world not suitable for human life, etc. Accordingly, the present invention comprises an expandable/retractable, deployable, and modular shelter that may be self-powered or long-term powered through multiple different power source technologies. To accomplish these various competencies, the present invention integrates multiple distinctive technologies and components in a known and modified version. In disaster struck areas, as well as in normal condition areas, the present invention offers the end-user the ability to utilize Infrared, Night vision, Automatic Dependent Surveillance-Broadcast, GPS, digital air traffic control software, transmit and receive radios, tactical weather sensors, drone identification, and detection software, Mode 5 (Friend or Foe Aircraft Identification) capabilities and AAM data from a remotely controlled secure location. Thus, the present invention is a self-sustaining, easily transportable, and efficient system that can be fielded worldwide for both short-term and long-term uses.

SUMMARY OF THE INVENTION

An objective of the present invention is to provide users with a compact, agile shelter system that can more than double in size when deployed and can be fielded in disaster areas, rural and remote locations, war zones, and regions of the world not suitable for human life, etc. Accordingly, the present invention comprises an expandable/retractable, deployable, and modular shelter that may be self-powered or long-term powered through multiple different power source technologies. To accomplish these various competencies, the present invention integrates multiple distinctive technologies and components in a known and modified version. In disaster struck areas, as well as in normal condition areas, the present invention offers the end-user the ability to utilize Infrared, Night vision, Automatic Dependent Surveillance-Broadcast, GPS, digital air traffic control software, transmit and receive radios, tactical weather sensors, drone identification, and detection software, Mode 5 (Friend or Foe Aircraft Identification) capabilities and AAM data from a remotely controlled secure location. Thus, the present invention is a self-sustaining, easily transportable, and efficient system that can be fielded worldwide for both short-term and long-term uses.

DETAIL DESCRIPTIONS OF THE INVENTION

All illustrations of the drawings are for the purpose of describing selected versions of the present invention and are not intended to limit the scope of the present invention.

The present invention is a tactical air control shelter. An objective of the present invention is to provide users with a compact remote aviation operations shelter, that more than doubles in size when deployed, and may be fielded in disaster areas, rural and remote locations, war zones, and regions not suitable for human life, etc. Accordingly, the present invention comprises an expandable, retractable, and modular shelter 1 that can be self-powered or long-term powered through multiple different power sources technologies. To accomplish these competencies, the present invention integrates distinctive technologies and components in known and modified versions. In disaster struck areas, war zones, as well as in enduring condition areas, the present invention offers the end-user the ability to operate a high-fidelity camera array system that delivers a picture from the fielded location that can support Infrared, Night vision, Automatic Dependent Surveillance-Broadcast, Radio Relay, weather, drone identification, and detection, as well as the option for Mode 5, Friend or Foe aircraft identification from a remotely operated secure location. Thus, the present invention is a self-sustaining, easily transportable, and efficient system that may be fielded worldwide in both short-term and long-term capacities. In reference to FIG. 1-2, the present invention comprises a modular shelter 1, a power source 13, a Very-Small-Aperture Satellite (VSAT) 23, a telescopic tower system 25, and a communication and server rack 31.

Figure 1:
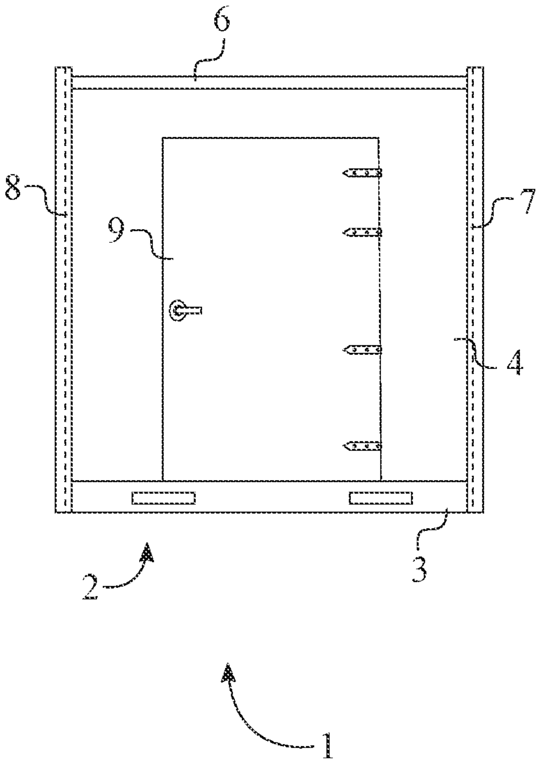
FIG. 1 is a front view of the present invention at the compact configuration.
Figure 2:
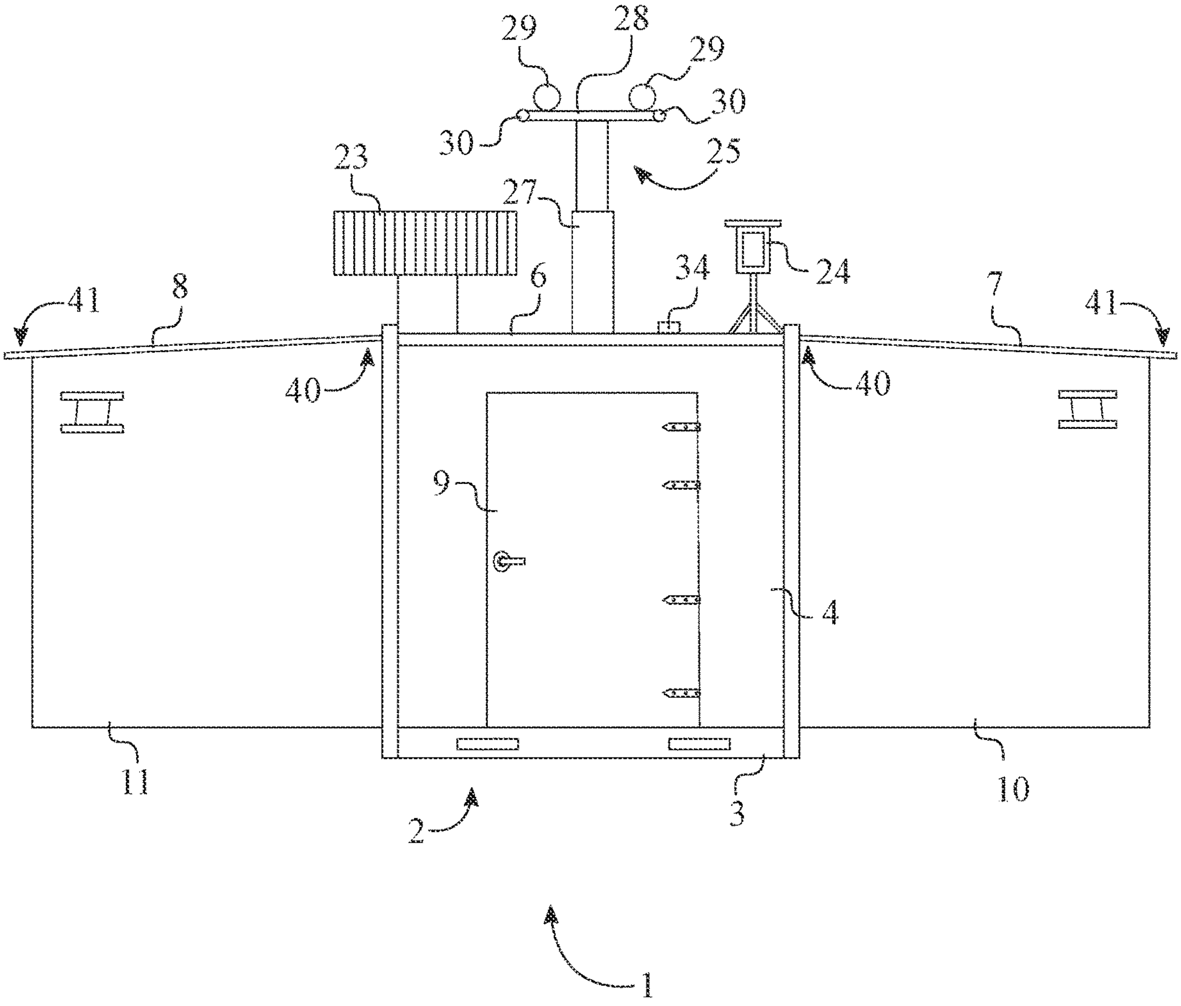
FIG. 2 is a front view of the present invention at the expanded configuration.

As shown in FIG. 1-2, the modular shelter 1 comprises a main shelter 2, a first expandable section 10, and a second expandable section 11. More specifically, the first expandable section 10 is slidably mounted to the main shelter 2 so that the first expandable section 10 can slide in and out of the main shelter 2. Similarly, the second expandable section 11 is slidably mounted to the main shelter 2 thus allowing the second expandable section 11 to slide in and out of the main shelter 2. In order to maximize the usable space, the first expandable section 10 and the second expandable section 11 are oppositely positioned of each other about the main shelter 2. As a result, the modular shelter 1 can collapse into a compact configuration for case of transportation and mobility, as well as expanded after being placed onto the field to maximize the usable space.

In reference to FIG. 1-2, the main shelter 2 comprises a base 3, a front panel 4, a rear panel 5, a roof 6, a first side panel 7, a second side panel 8, and at least one door 9. The main shelter 2 is preferably formed into a cuboid shaped so that the first expandable section 10 and the second expandable section 11 can laterally extend. More specifically, the front panel 4 and the rear panel 5 are oppositely positioned of each other about the base 3 wherein the front panel 4 and the rear panel 5 are perpendicularly connected to the base 3. The roof 6 is positioned parallel to the base 3 and connected to the front panel 4 and the rear panel 5. The first side panel 7 is hingedly connected to the roof 6 and positioned perpendicular to the front panel 4 and the rear panel 5. Due to the hinged connection between the roof 6 and the first side panel 7, the first side panel 7 can be opened upward to facilitate the movement of the first expandable section 10. The second side panel 8 is hingedly connected to the roof 6 and opposite the first side panel 7, wherein the second side panel 8 is positioned perpendicular to the front panel 4 and the rear panel 5. Due to the hinged connection between the roof 6 and the second side panel 8, the second side panel 8 can be opened upward to facilitate the movement of the second expandable section 11. The at least one door 9 allows the users to access and exit the main shelter 2. The at least one door 9 is preferably connected to the front panel 4; however, the at least one door 9 can also be connected to the rear panel 5 without deviating from the scope of the functionality.

When the present invention is at the compact configuration, the first expandable section 10 is positioned within the main shelter 2 and enclosed by the first side panel 7 as shown in FIG. 1. When the present invention is at the expanded configuration, the first expandable section 10 is outwardly positioned to the main shelter 2 as shown in FIG. 2. More specifically, the user first angularly lifts up the first side panel 7 due to the hinged connection between the first side panel 7 and the roof 6. Then, the first expandable section 10 can be slid out thus allowing the first side panel 7 to function as a rooftop for the first expandable section 10. In other words, as shown in FIG. 2, the first side panel 7 of the main shelter 2 is angularly positioned to the base 3. A proximal end 40 of the first side panel 7 is hingedly connected to the roof 6. A distal end 41 of the first side panel 7 is removably mounted to the first expandable section 10 so that the first side panel 7 can be secured as a rooftop.

When the present invention is at the compact configuration, the second expandable section 11 is positioned within the main shelter 2 and enclosed by the second side panel 8 as shown in FIG. 1. When the present invention is at the expanded configuration, the second expandable section 11 is outwardly positioned to the main shelter 2 as shown in FIG. 2. More specifically, the user first angularly lifts up the second side panel 8 due to the hinged connection between the second side panel 8 and the roof 6. Then, the second expandable section 11 can be slid out thus allowing the second side panel 8 to function as a rooftop for the second expandable section 11. In other words, as shown in FIG. 1, the second side panel 8 of the main shelter 2 is angularly positioned to the base 3. A proximal end 40 of the second side panel 8 is hingedly connected to the roof 6. A distal end 41 of the second side panel 8 is removably mounted to the second expandable section 11 so that the second side panel 8 can be secured as a rooftop.

Figure 6:
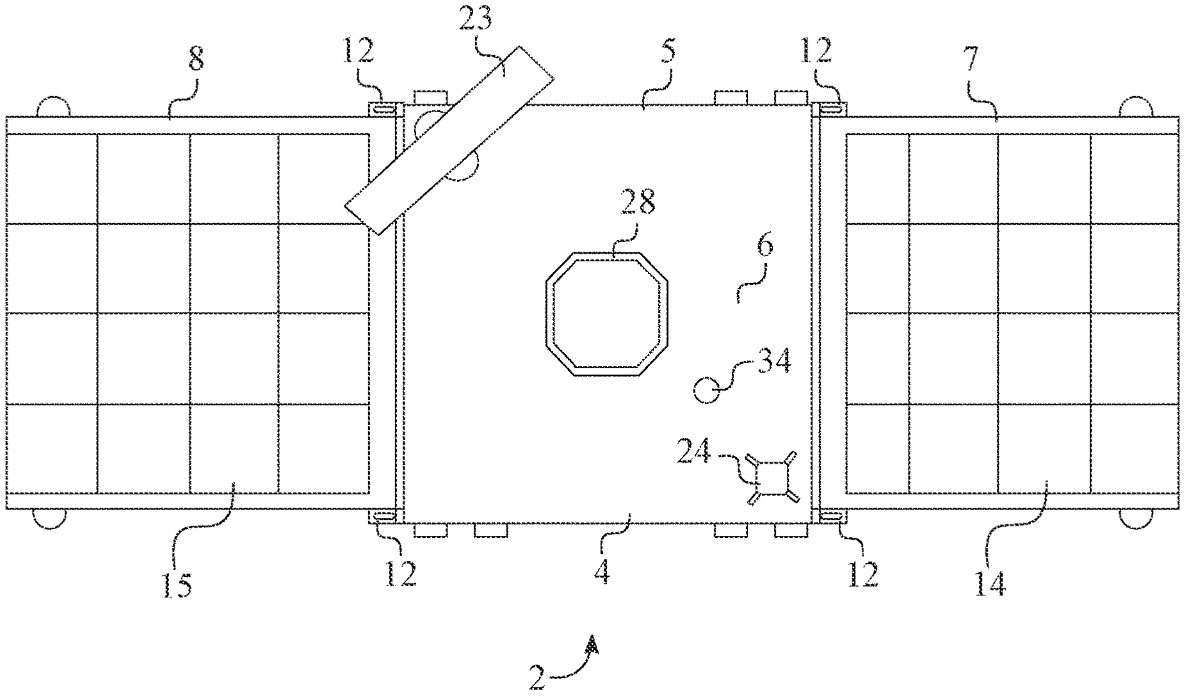
FIG. 6 is a top view of the present invention at the expanded configuration.

In reference to FIG. 6, the present invention further comprises a plurality of handling features 12 to accomplish case and agility of transportation. Each of the plurality of handling features 12 is integrated into the main shelter 2 and perimetrically positioned the roof 6 of the main shelter 2. Preferably, each of the plurality of handling features 12 traverses into the main shelter 2 so that different kinds of handling structures may be inserted or threaded through each of the plurality of handling features 12 while moving the modular shelter 1 into a shipping container or for ease of use with any other transport/shipping means. Preferably, the shipping container is ISO 1496-1-Vehicle Mounted and 463L aircraft-certified load compliant. Further, the container is also preferred to be C-130, C-17, and C-5 Aircraft certified cargo. However, any other transportation means that are known within the art may be used, as long as the objectives of the plurality of handling features 12 are fulfilled.

Figure 5:
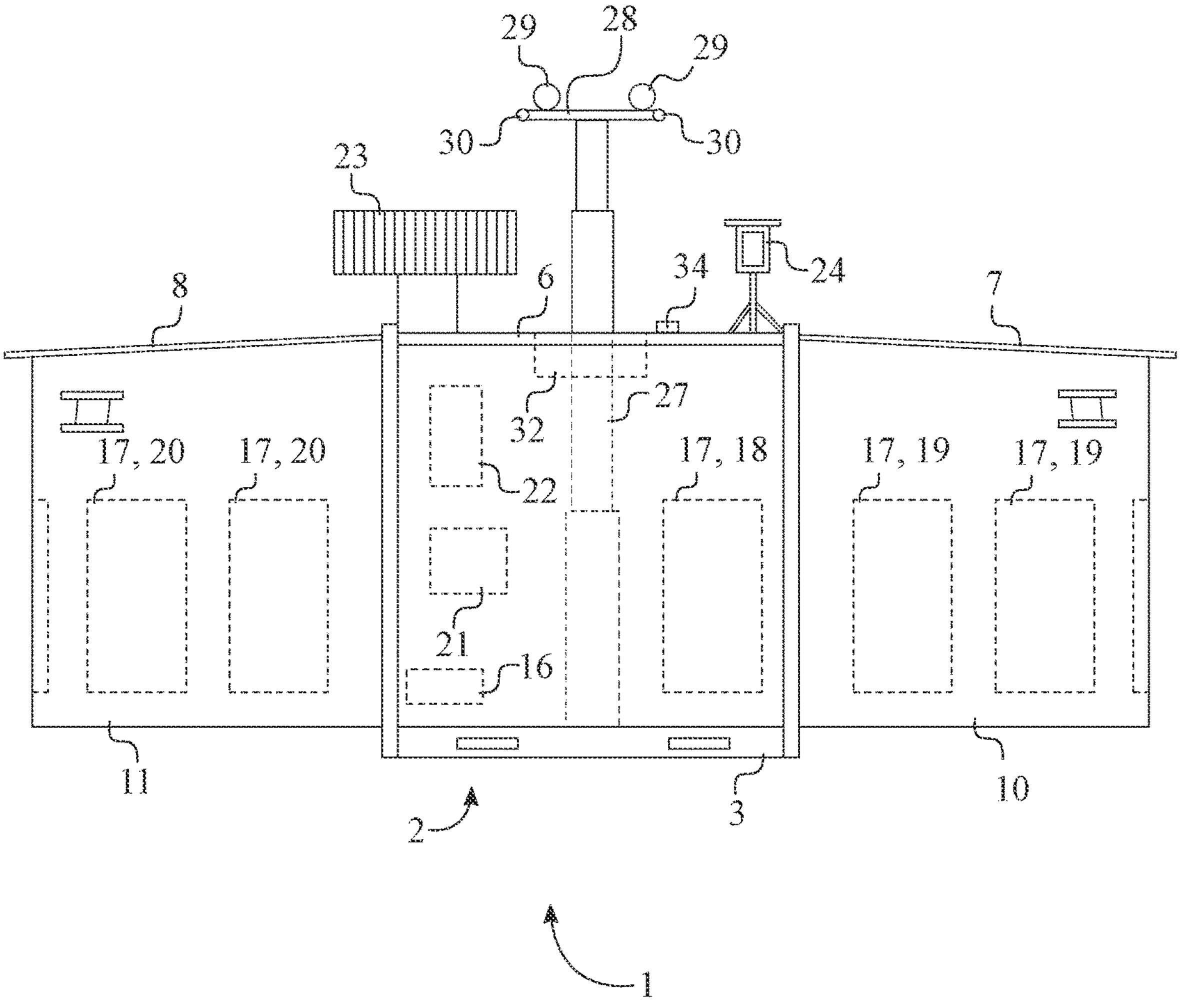
FIG. 5 is a view showing the internally positioned components within the main shelter, the first expandable section, and the second expandable section.
Figure 7:
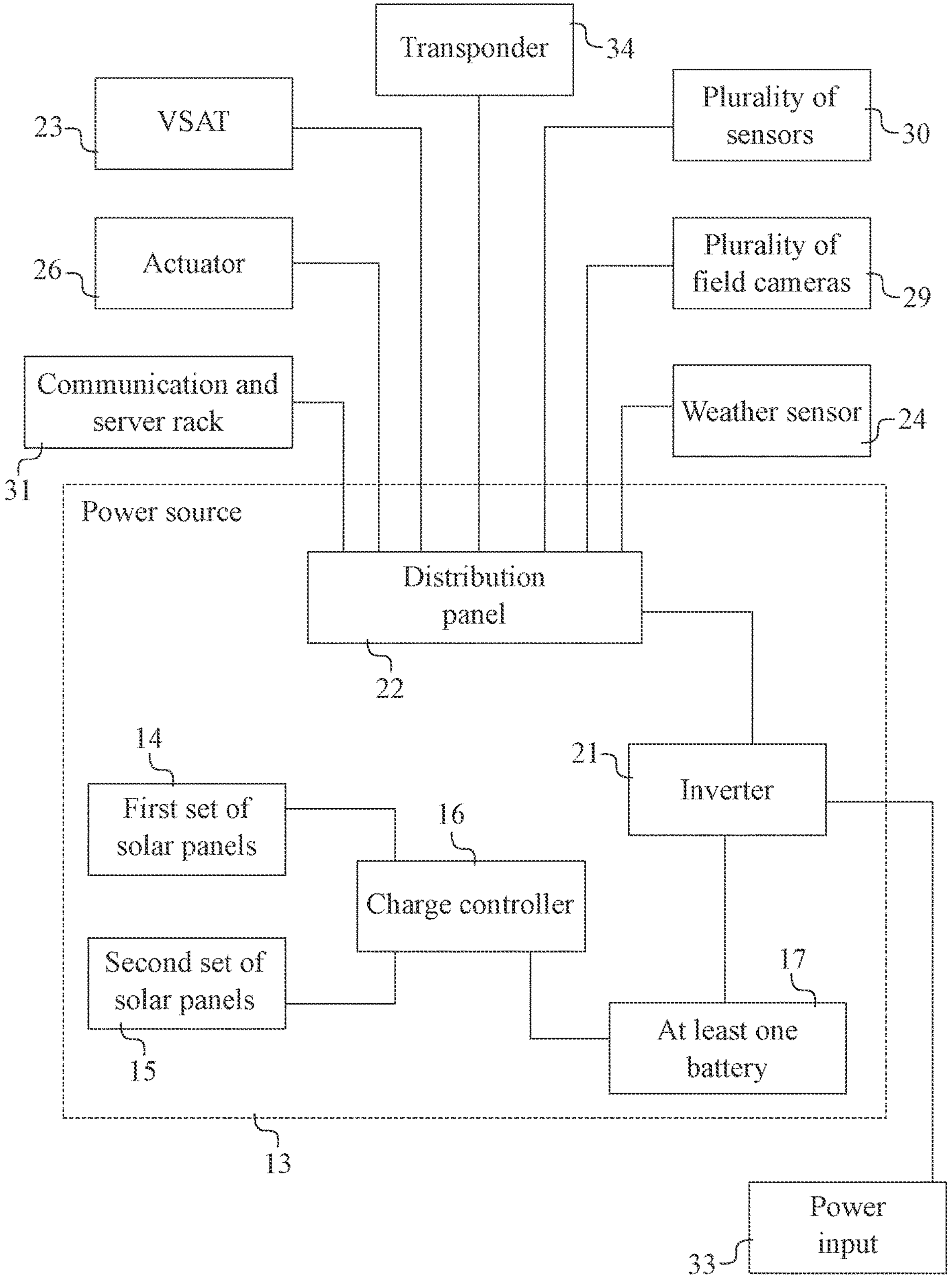
FIG. 7 is a schematic view showing the electrical connections of the present invention.

In reference to FIG. 5-7, the power source 13 integrated into the main shelter 2, the first expandable section 10, and the second expandable section 11 so that electrical components within the present invention can be powered. It is the objective of the present invention to integrate multiple sources of power so as to provide renewable energy, fuel, and shore power to run the electrical components of the present invention in any conditions. Accordingly, the present invention can be powered with a solar power unit, a wireless and rechargeable battery unit, a hardline power unit, a generator, or any other types of renewable energy systems. Preferably, the power source 13 is a solar power unit and comprises a first set of solar panels 14, a second set of solar panels 15, a charge controller 16, at least one battery 17, an inverter 21, and a distribution panel 22. The first set of solar panels 14 is mounted to the first side panel 7 of the main shelter 2 so that the first set of solar panels 14 can be operational when the present invention is at the expanded configuration. Similarly, the second set of solar panels 15 is mounted to the second side panel 8 of the main shelter 2 thus allowing the second set of solar panels 15 to be operational when the present invention is at the expanded configuration. The charge controller 16, the inverter 21, and the distribution panel 22 are mounted to the main shelter 2 so that the solar power unit can be operational. The at least one battery 17 is attached within the modular shelter 1 so that the generated electricity can be stored. In order to protect from outside elements, the charge controller 16, the inverter 21, and the distribution panel 22 are positioned within the main shelter 2, and the at least one battery 17 is positioned within the modular shelter 1. The first set of solar panels 14 and the second set of solar panels 15 are electrically connected to the distribution panel 22 through the charge controller 16, the at least one battery 17, and the inverter 21 so that the power source 13 of the present invention is able to convert sunlight into electricity.

In reference to FIG. 5 and FIG. 7, the at least one battery 17 comprises a main battery bank 18, a first battery bank 19, and a second battery bank 20. More specifically, the main battery bank 18 is mounted within the main shelter 2 so that the present invention can be operational with respect to the compact configuration. The first battery bank 19 and the second battery bank 20 function as additional batteries so that the operational activities of the present invention can be extended. The first battery bank 19 is removably mounted to the first expandable section 10 and electrically connected to the main battery bank 18. The second battery bank 20 is removably mounted to the second expandable section 11 and electrically connected to the main battery bank 18. For example, the first battery bank 19 is mounted to the first expandable section 10 and the second battery bank 20 is mounted to the second expandable section 11 only when the present invention is at the expanded configuration. When the present invention is at the compact configuration, the first battery bank 19 and the second battery bank 20 are removed from the corresponding sections and stored within the main shelter 2.

Figure 4:
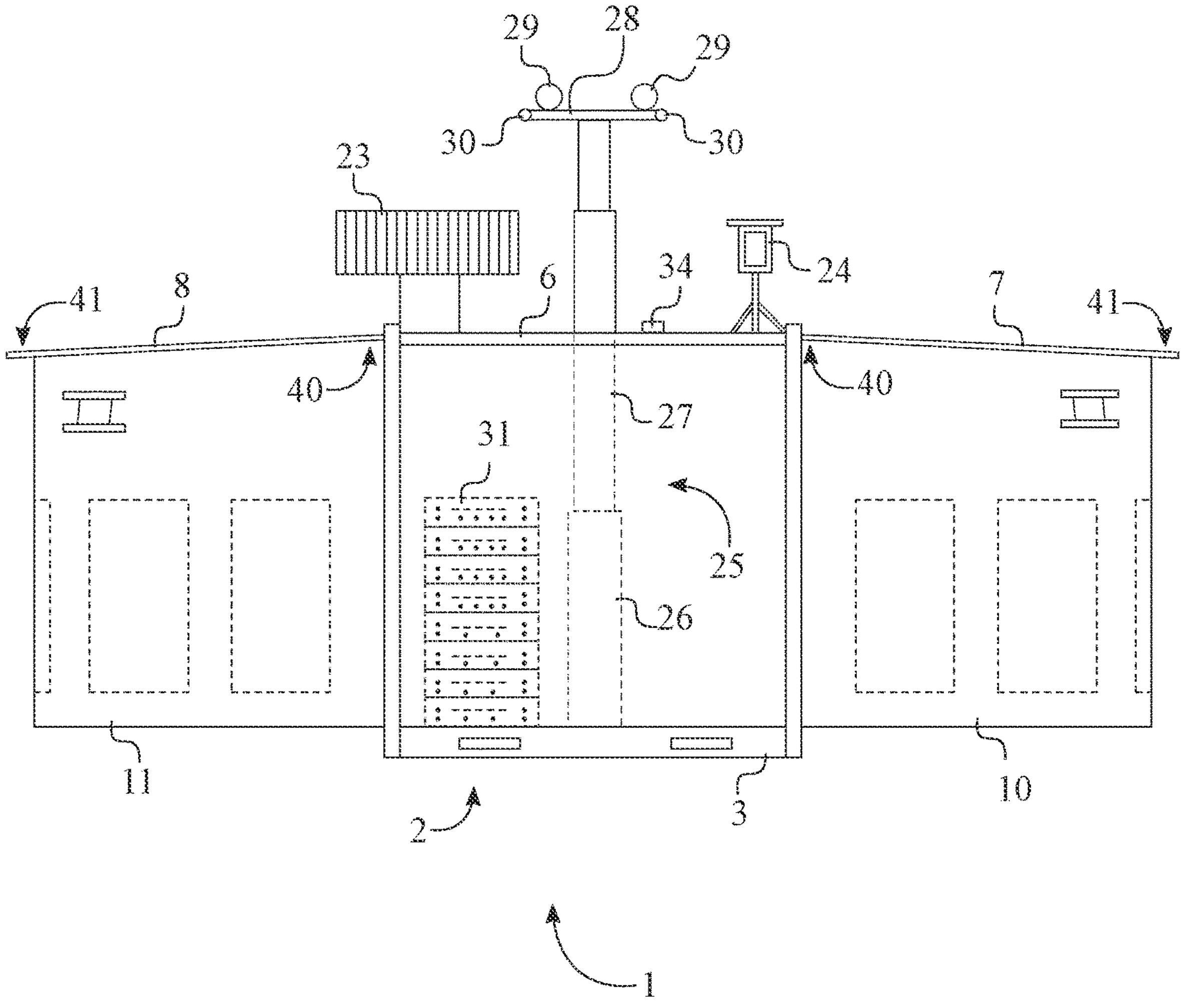
FIG. 4 is a view showing the internally positioned components within the main shelter.
Figure 8:
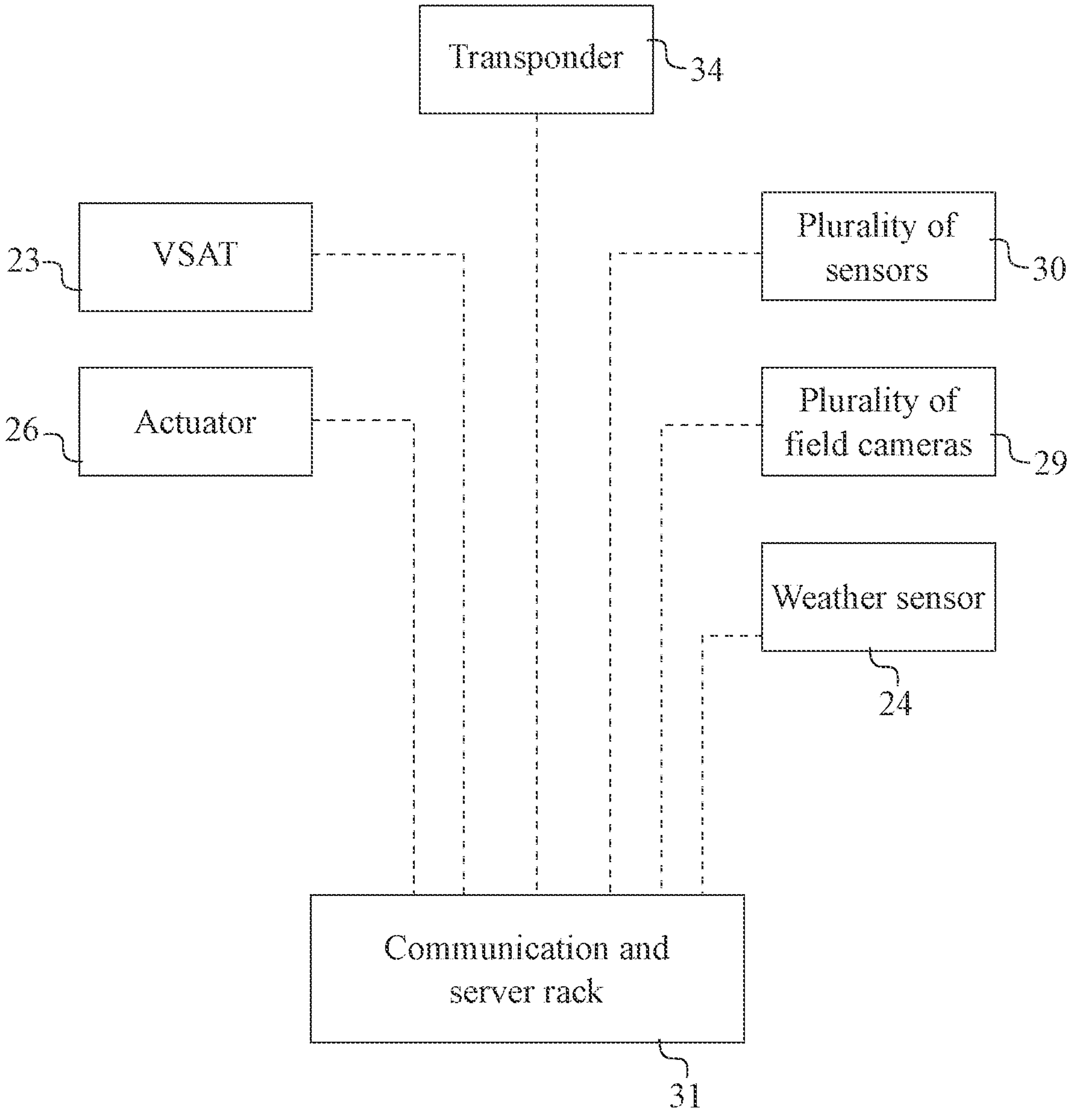
FIG. 8 is a schematic view showing the electronic connections of the present invention.

In reference to FIG. 4 and FIG. 7-8, the communication and server rack 31 is internally mounted to the main shelter 2 so that the electrical components of the present invention can be operated. More specifically, the communication and server rack 31 is mounted onto the base 3 of the main shelter 2 without interfering with the movement of the first expandable section 10 and the second expandable section 11. The communication and server rack 31 is electrically connected to the distribution panel 22 of the power source 13 so that the communication and server rack 31 can be electrically powered. In order for all the various electric, electronic, and communication systems to function properly, the communication and server rack 31 contains vital equipment including servers, patch panels, routers, switches, hubs, and support materials such as rack rails. Furthermore, the communication and server rack 31 enables the users to electronically connect their remote computing devices.

In reference to FIG. 2 and FIG. 7-8, the VSAT 23 is externally mounted to the main shelter 2 to transmit and receive the high-fidelity sight picture and communications, data through wireless communication data transfer. More specifically, the VSAT 23 is mounted onto the roof 6 of the main shelter 2 and electrically connected to the distribution panel 22 of the power source 13 so that the VSAT 23 can be electrically powered. The VSAT 23 is electronically connected to the communicant and server rack 31 so that the VSAT 23 can be operated and is able to communicate with the end users. Furthermore, the VSAT 23 is operational on any other data transmission modes or technologies known to one of ordinary skill in the art. For example, data transmission of the VSAT 23 can happen through a Local Area Network (LAN) or Wide Area Network (WAN), depending on the technology availability at that location of the modular shelter 1. In reference to FIG. 4 and FIG. 7-8, the telescopic tower system 25 is internally mounted to the main shelter 2 so that varies surveillance devices can be securely positioned atop the modular shelter 1. The telescopic tower system 25 comprises an actuator 26, a telescopic body 27, and an upper mounting bracket 28. The actuator 26 is mounted onto the base 3 of the main shelter 2. Preferably, the actuator 26 is a remotely controlled lifting and lowering unit that is electronically controlled through the communication and ser rack. This actuator 26 can function as a motorized device, wherein the actuator 26 is electrically connected to the distribution panel 22 of the power source 13. The actuator 26 can also be operated manually device as a redundancy if needed. Furthermore, the actuator 26 system is centrally mounted within the central housing so that the mounted surveillance devices can be optimally positioned. The telescopic body 27 is mounted onto the actuator 26 and positioned opposite to the base 3. The actuator 26 is operatively coupled to the telescopic body 27, wherein the actuator 26 is able to extend and contract the telescopic body 27. In other words, A first terminal end of the telescopic body 27 is mounted onto the actuator 26, and a second terminal end of the telescopic body 27 is able to extend and retract through the roof 6 through the operation of the actuator 26. In order for the second terminal end to be moved through the roof 6, the present invention can further comprise a hatch. Preferably, the hatch is concentrically positioned to the telescopic body 27 and operatively coupled to the modular shelter 1, wherein operation of the hatch governs access to the inner cavity. Accordingly, when the telescopic body 27 needs to be extended outside the modular shelter 1, the hatch is operated so as to enable access and way for the telescopic body 27 to protrude outside of the modular shelter 1. Furthermore, the hatch can be configured to operate manually, integrated into the operation of the telescopic body 27, or motorized to open simultaneously with the operation of the telescopic body 27. When the hatch is motorized, the hatch is electrically connected to the distribution panel 22 of the power source 13 and electronically connected to the communication and server rack 31. The upper mounting bracket 28 is mounted onto the telescopic body 27 and positioned opposite to the actuator 26. More specifically, the upper mounting bracket 28 provide a stable platform to attach or interchange surveillance devices.

In reference to FIG. 2-3 and FIG. 7-8, the present invention further comprises a plurality of field cameras 29 that can function as the surveillance devices. More specifically, the plurality of field cameras 29 is mounted to the upper mounting bracket 28 so that the plurality of field cameras 29 can be positioned atop the modular shelter 1. The plurality of field cameras 29 is electrically connected to the distribution panel 22 of the power source 13 so that the plurality of field cameras 29 can be electrically powered. The plurality of field cameras 29 is electronically connected to the communication and server rack 31 so that the users can operate the plurality of field cameras 29, and the communication and server rack 31 is able to receive data from the plurality of field cameras 29.

In reference to FIG. 2-3 and FIG. 7-8, the present invention further comprises a plurality of sensors 30 that can function as the surveillance devices. More specifically, the plurality of sensors 30 is mounted to the upper mounting bracket 28 so that the plurality of sensors 30 can be positioned atop the modular shelter 1. The plurality of sensors 30 is electrically connected to the distribution panel 22 of the power source 13 so that the plurality of sensors 30 can be electrically powered. The plurality of sensors 30 is electronically connected to the communication and server rack 31 so that the users can operate the plurality of sensors 30, and the communication and server rack 31 is able to receive data from the plurality of sensors 30. Even though the surveillance devices are explained in relation to the plurality of field cameras 29 and the plurality of sensors 30, the present invention may comprise any other surveillance devices that help in fields such as air traffic management, public safety, risk management, and transport.

Additionally, the present invention may comprise at least one side-mount, wherein the at least one side-mount is detachably mounted to the first side panel 7 or the second side panel 8. The at least one side-mount may be used for multiple purposes such as for holding a light, camera, sensor, equipment, etc.

In reference to FIG. 5, the present invention further comprises a weather housing 32 that is radially interposed between the telescopic body 27 of the telescopic tower system 25 and the roof 6 of the main shelter 2. The weather housing 32 protects the internal components situated within the modular shelter 1 from outside elements and extreme weather conditions. In other words, once the second terminal end of the telescopic body 27 is lifted to just above the roof 6, the weather housing 32 creates an airtight barrier between the telescopic body 27 and the roof 6 thus providing a weatherproof 6 barrier from the elements.

In reference to FIG. 2-3 and FIG. 7-8, the present invention further comprises at least one weather sensor 24. It is an objective of the weather sensor 24 to work in any adverse weather conditions and report/transmit weather information to necessary end-user sources. The weather sensor 24 is externally mounted onto the roof 6 of the main shelter 2. The weather sensor 24 is electrically connected to a distribution panel 22 of the power source 13 so that the weather sensor 24 can be electrically powered. The weather sensor 24 is electronically connected to the communication and server rack 31 so that the users can operate the weather sensor 24, and the communication and server rack 31 is able to receive data from the weather sensor 24.

Figure 3:
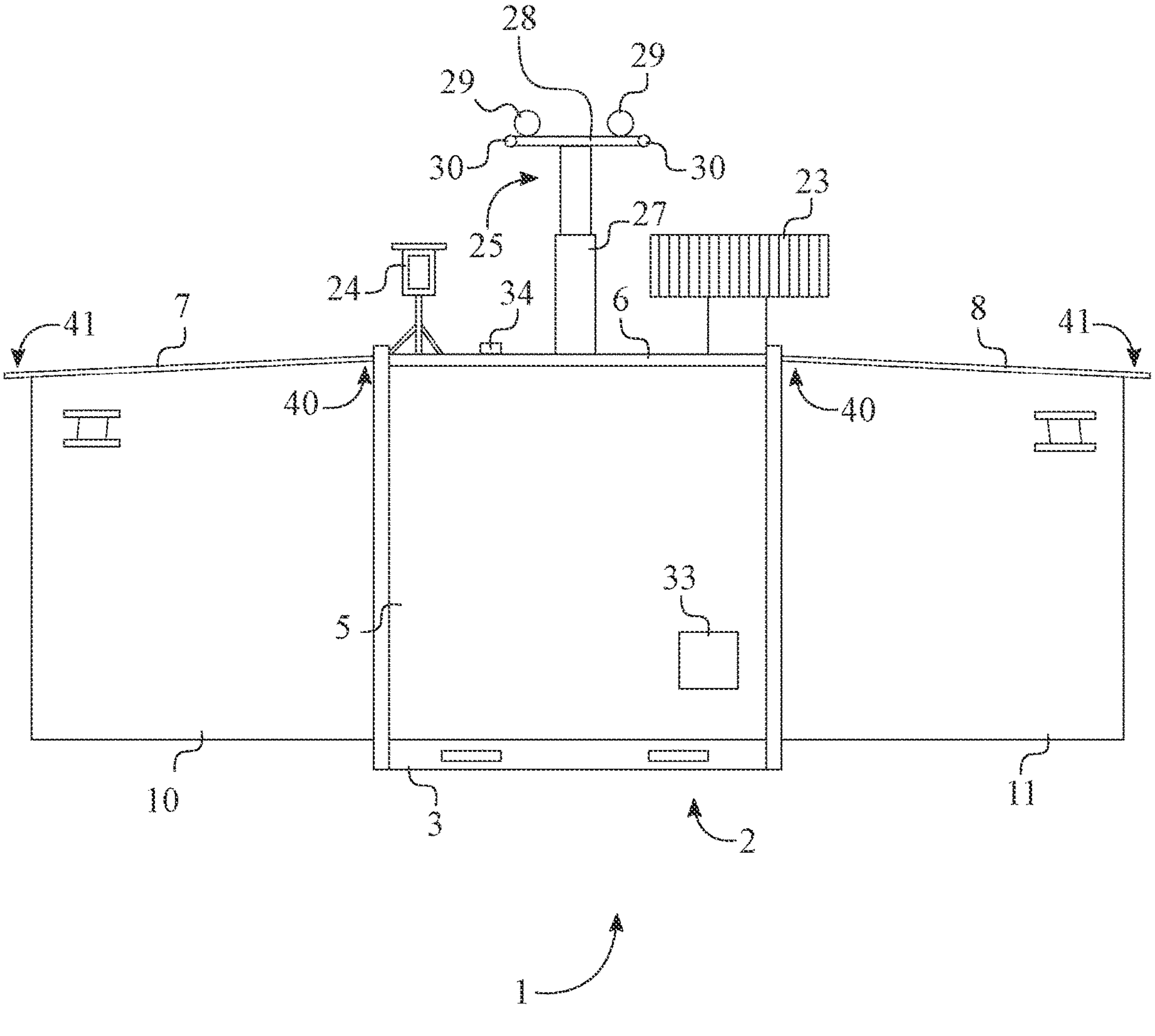
FIG. 3 is a rear view of the present invention at the expanded configuration.

In reference to FIG. 3 and FIG. 7, the present invention further comprises a power input 33. The power input 33 is externally mounted to the main shelter 2 and electrically connected to the inverter 21 of the power source 13. As a result, the power input 33 allows the external power-source such as a hardline electrical power, a generator, or any other types of renewable energy systems to electrically powers the distribution panel 22 when the first set of solar panels 14 and the second set of solar panels 15 are not able to generate electricity.

In reference to FIG. 3 and FIG. 7, the present invention further comprises a transponder 34 to relay communication signals from satellites. The transponder 34 is preferably mounted onto the roof 6 of the main shelter 2 and electrically connected to the distribution panel 22 of the power source 13 so that the transponder 34 can be electrically powered. The transponder 34 is electronically connected to the communicant and server rack 31 so that the transponder 34 can be operated and is able to communicate with the end users. Furthermore, the transponder 34 comprises a Mode 5 IFF (identification friend of foe) system. The Mode 5 IFF system is a cooperative identification system that uses interrogators and transponders located on host platforms to send, receive, and process friendly identification data.

Thus, through the integration of multiple power sources, the VSAT 23 (mainly a low Earth orbital system that delivers low-latency broadband internet worldwide), the first set of solar panels 14, the second set of solar panels 15, the at least one battery 17, the weather sensor 24, the telescopic tower system 25, and the communication and server rack 31, the present invention enables a fully self-sustaining and mobile command, control, communications, computers, intelligence, reconnaissance, remote operations shelter. Further, all of the abovementioned components, the present invention offers the end-user the ability to operate infrared, night vision, automatic dependent surveillance-broadcast, Mode 5, friend or foe aircraft identification, radio relay, real-time weather, drone identification, and detection from a remote secure location.

Although the invention has been explained in relation to its preferred embodiment, it is to be understood that many other possible modifications and variations can be made without departing from the spirit and scope of the invention as hereinafter claimed.

What is claimed is:

1. A tactical air control shelter comprising:
- a modular shelter;
- a power source;
- a Very-Small-Aperture Satellite (VSAT);
- a telescopic tower system;
- a communication and server rack;
- the modular shelter comprising a main shelter, a first expandable section, and a second expandable section;
- the first expandable section being slidably mounted to the main shelter;
- the second expandable section being slidably mounted to the main shelter;
- the first expandable section and the second expandable section being oppositely positioned of each other about the main shelter;
- the power source being integrated into the main shelter, the first expandable section, and the second expandable section;
- the VSAT being externally mounted to the main shelter;
- the telescopic tower system being internally mounted to the main shelter;
- the communication and server rack being internally mounted to the main shelter;
- the VSAT, the telescopic tower system, and the communication and server rack being electrically connected to the power source; and
- a power input;
- the power input being externally mounted to the main shelter; and
- the power input being electrically connected to an inverter of the power source.

2. The tactical air control shelter as claimed in claim 1 comprising:
- the main shelter comprising a base, a front panel, a rear panel, a roof, a first side panel, a second side panel, and at least one door;
- the front panel and the rear panel being oppositely positioned of each other about the base;
- the front panel and the rear panel being perpendicularly connected to the base;
- the roof being positioned parallel to the base;
- the roof being connected to the front panel and the rear panel;
- the first side panel being hingedly connected to the roof;
- the first side panel being positioned perpendicular to the front panel and the rear panel;
- the second side panel being hingedly connected to the roof, opposite of the first side panel;
- the second side panel being positioned perpendicular to the front panel and the rear panel; and
- the at least one door being connected to the front panel.

3. The tactical air control shelter as claimed in claim 2 comprising:
- the first expandable section outwardly positioned to the main shelter;
- a first side panel of the main shelter being angularly positioned to the base;
- a proximal end of the first side panel being hingedly connected to the roof;
- a distal end of the first side panel being removably mounted to the first expandable section;

the second expandable section outwardly positioned to the main shelter;
a second side panel of the main shelter being angularly positioned to the base;
a proximal end of the second side panel being hingedly connected to the roof; and
a distal end of the second side panel being removably mounted to the second expandable section.

4. The tactical air control shelter as claimed in claim 1 comprising:
the communication and server rack being mounted onto a base of the main shelter; and
the communication and server rack being electrically connected to a distribution panel of the power source.

5. The tactical air control shelter as claimed in claim 1 comprising:
the VSAT being mounted onto a roof of the main shelter;
the VSAT being electrically connected to a distribution panel of the power source; and
the VSAT being electronically connected to the communication and server rack.

6. The tactical air control shelter as claimed in claim 1 comprising:
a plurality of handling features;
each of the plurality of handling features being integrated into the main shelter; and
each of the plurality of handling features being perimetrically positioned a roof of the main shelter.

7. The tactical air control shelter as claimed in claim 1 comprising:
the power source comprising a first set of solar panels, a second set of solar panels, a charge controller, at least one battery, an inverter, and a distribution panel;
the first set of solar panels being mounted to a first side panel of the main shelter;
the second set of solar panels being mounted to a second side panel of the main shelter;
the charge controller, the inverter, and the distribution panel being mounted to the main shelter;
the charge controller, the inverter, and the distribution panel being positioned within the main shelter;
the at least one battery being attached to the modular shelter;
the at least one battery being positioned within the modular shelter; and
the first set of solar panels and the second set of solar panels being electrically connected to the distribution panel through the charge controller, the at least one battery, and the inverter.

8. The tactical air control shelter as claimed in claim 7 comprising:
the at least one battery comprising a main battery bank, a first battery bank, and a second battery bank;
the main battery bank being mounted within the main shelter;
the first battery bank being removably mounted to the first expandable section; and
the second battery bank being removably mounted to the second expandable section.

9. The tactical air control shelter as claimed in claim 1 comprising:
the telescopic tower system comprising an actuator, a telescopic body, and an upper mounting bracket;
the actuator being mounted onto a base of the main shelter;
the telescopic body being mounted onto the actuator, opposite of the base;
the upper mounting bracket being mounted onto the telescopic body, opposite of the actuator;
the actuator being operatively coupled to the telescopic body, wherein the actuator extends and contracts the telescopic body;
the actuator being electrically connected to a distribution panel of the power source; and
the actuator being electronically connected to the communicant and server rack.

10. The tactical air control shelter as claimed in claim 1 comprising:
a plurality of field cameras;
the telescopic tower system comprising an upper mounting bracket;
the plurality of field cameras being mounted to the upper mounting bracket;
the plurality of field cameras being electrically connected to a distribution panel of the power source; and
the plurality of field cameras being electronically connected to the communicant and server rack.

11. The tactical air control shelter as claimed in claim 1 comprising:
a plurality of sensors;
the telescopic tower system comprising an upper mounting bracket;
the plurality of sensors being mounted to the upper mounting bracket;
the plurality of sensors being electrically connected to a distribution panel of the power source; and
the plurality of sensors being electronically connected to the communicant and server rack.

12. The tactical air control shelter as claimed in claim 1 comprising:
a weather housing; and
the weather housing being radially interposed between a telescopic body of the telescopic tower system and a roof of the main shelter.

13. The tactical air control shelter as claimed in claim 1 comprising:
at least one weather sensor;
the weather sensor being externally mounted onto a roof of the main shelter;
the weather sensor being electrically connected to a distribution panel of the power source; and
the weather sensor being electronically connected to the communicant and server rack.

14. The tactical air control shelter as claimed in claim 1 comprising:
a transponder;
the transponder being externally mounted onto a roof of the main shelter;
the transponder being electrically connected to a distribution panel of the power source; and
the transponder being electronically connected to the communicant and server rack.

* * * * *